United States Patent [19]

Nussbaum

[11] 4,363,218
[45] Dec. 14, 1982

[54] HEAT PUMP USING SOLAR AND OUTDOOR AIR HEAT SOURCES

[75] Inventor: Otto J. Nussbaum, Huntsville, Ala.

[73] Assignee: Halstead Industries, Inc., Scottsboro, Ala.

[21] Appl. No.: 252,799

[22] Filed: Apr. 10, 1981

[51] Int. Cl.³ .................... G05D 23/00; F25B 27/02
[52] U.S. Cl. ...................................... 62/79; 62/238.6; 62/235.1; 237/2 B
[58] Field of Search ............... 237/2 B; 62/238.6, 79, 62/99, 235.1; 126/436

[56] References Cited

U.S. PATENT DOCUMENTS

| | | | |
|---|---|---|---|
| 3,996,759 | 12/1976 | Meckler | 62/238.6 X |
| 4,091,636 | 5/1978 | Margen | 62/238.6 |
| 4,111,259 | 9/1978 | Lebduska | 237/1 A |
| 4,165,036 | 8/1979 | Meckler | 237/2 B X |
| 4,187,687 | 2/1980 | Savage | 237/2 B |

Primary Examiner—William E. Wayner
Attorney, Agent, or Firm—Thomas H. Murray; Clifford A. Poff

[57] ABSTRACT

A heat pump system uses a non-reversing refrigeration circuit having a water-cooled condenser and a counterflow chiller fed by a thermostatic expansion valve to permit operation at close to zero superheat. To protect the compressor in the refrigeration circuit from possible flood-back at this low superheat, a combination suction-liquid heat exchanger-suction accumulator is employed. A hold-back valve serves to maintain constant compressor suction pressure regardless of evaporator pressure fluctuations caused by changing chiller fluid temperatures. The system is designed to operate in four distinct modes: (1) water source heat pump heating; (2) direct solar heating; (3) air source heat pump heating; and (4) heat pump cooling. To switch the refrigeration circuit to heat pump mode from the cooling mode or vice versa, four three-way valves and three fluid pumps are selectively operated. The fluid circuit of the system consists of two separate coils in an air-handling unit. One coil is connected to the solar collector circuit and may be used for either heating or cooling. A second coil is connected to the condenser circuit and works during the heat pump cycle.

10 Claims, 4 Drawing Figures

| CYCLE | 3-WAY VALVE | | | | PUMPS | | |
|---|---|---|---|---|---|---|---|
| | 34 | 55 | 62 | 44 | 33 | 54 | 50 |
| COOLING | ON | OFF | ON | OFF | ON | OFF | ON |
| DIRECT SOLAR HEAT | OFF | OFF | ON | OFF | OFF | ON | ON |
| WATER SOURCE HEAT PUMP | OFF | OFF | OFF | ON | ON | ON | ON |
| AIR SOURCE HEAT PUMP | OFF | ON | OFF | ON | ON | ON | ON |

| CYCLE | 3-WAY VALVE | | | | PUMPS | | |
|---|---|---|---|---|---|---|---|
| | 34 | 55 | 62 | 44 | 33 | 54 | 50 |
| COOLING | ON | OFF | ON | OFF | ON | OFF | ON |
| DIRECT SOLAR HEAT | OFF | OFF | ON | OFF | OFF | ON | ON |
| WATER SOURCE HEAT PUMP | OFF | OFF | OFF | ON | ON | ON | ON |
| AIR SOURCE HEAT PUMP | OFF | ON | OFF | ON | ON | ON | ON |

DIRECT HEATING

AIR SOURCE HEAT PUMP HEATING

HEAT PUMP COOLING

HEAT PUMP USING SOLAR AND OUTDOOR AIR HEAT SOURCES

BACKGROUND OF THE INVENTION

The heat pump system of the present invention is designed to operate in one of four different modes with respect to indoor air, namely (1) solar energy source heat pump heating; (2) direct heating; (3) air source heat pump heating; and (4) heat pump cooling. The heat pump system employs a non-reversing refrigeration cycle and utilizes heat exchangers, preferably in the form of a water-cooled condenser and a counterflow chiller in a fluid circuit where an expansion valve responds to the temperature of the refrigerant at the evaporator outlet to form a control capable of operating as close to zero degree superheat as feasible. A combination suction-liquid heat exchanger and suction accumulator protects the compressor from possible flood-back at this low superheat. The non-reversing refrigeration cycle, in the preferred form of the invention, includes a hold-back valve also known as a crankcase pressure regulator to maintain constant compressor suction pressure regardless of evaporator pressure fluctuations due to changing fluid medium temperatures in the chiller.

In the well-known form of a heat pump, compressed refrigerant is evaporated in an outdoor evaporator coil or heat exchanger and thereafter the expanded refrigerant is compressed and passed through a condenser to extract heat from the condensing refrigerant for heating the interior of a building. The refrigeration cycle is reversed during warm weather such that the system operates as an air conditioner. In cold climates, the heat pump must operate at outdoor temperatures below $+32°$ F., sometimes as low as $-20°$ F. At these temperatures, the evaporating temperature of the refrigerant in the outdoor evaporating coil drops to a point where the coefficient of performance of the heat pump is uneconomically low. The coefficient of performance falls to 2.0 or lower. This fails to provide sufficient heating capability.

A non-reversing compression refrigeration cycle is used by the present invention. This eliminates many service problems encountered with reversing heat pumps. In cold climates, solar energy supplies a useful heat source that is limited to daylight hours and favorable atmospheric conditions. At outdoor temperatures of $+40°$ F. or higher, ambient air provides a useful heat source that is not subject to the same limitations as solar energy. These two heat sources can be used effectively in a heating system. The present invention integrates the use of these two heat sources into a heat pump system for various and alternative modes of operation.

SUMMARY OF THE INVENTION

It is an object of the present invention to provide a heat pump system based on a non-reversing refrigeration cycle utilizing a plurality of heat sources including ambient air and solar radiation for an economically practical operation at acceptable coefficients of performance.

Another feature of the invention provides a heat pump system for operation in four distinct modes, namely solar energy source heat pump heating, direct heating, air source heat pump heating and heat pump cooling. Additionally, the heat pump system of the invention permits operation of the non-reversing refrigeration cycle at low superheat by the use of a temperature-controlled expansion valve and protective measures for the refrigeration compressor against possible flood-back at the low superheat by a combined suction-liquid heat exchanger and suction accumulator.

A still further feature of the invention resides in the provision of a hold-back valve to maintain constant compressor suction pressure regardless of evaporator pressure fluctuations caused by the fluid medium for an associated heat exchanger.

In one aspect of the present invention, there is provided a heat pump including the combination of an outdoor air heat exchanger for supplying heat to a fluid medium only at a high coefficient of performance, a solar energy heat exchanger for supplying heat to a fluid medium at times other than the operation of the outdoor air heat exchanger, means including a storage container for selectively circulating the fluid medium to either of the outdoor air heat exchanger or the solar energy heat exchanger, an indoor heat exchanger, and means forming a non-reversing refrigeration cycle for transferring heat from the fluid medium withdrawn from the storage container to the indoor heat exchanger.

More specifically, there is provided a first conduit means for a fluid medium to interconnect an outdoor heat exchanger and a solar radiation heat exchanger with a storage tank and pump, means for interrupting communication between the storage tank and either the solar radiation heat exchanger or the outdoor air heat exchanger, a second conduit means for refrigerant to interconnect a compressor and first and second heat exchangers for operation in a non-reversing vapor compression cycle, an expansion valve means arranged in the second conduit means for the second heat exchanger, a third conduit means to interconnect the storage tank and the first heat exchanger for transfer of heat energy by a fluid medium, and a fourth conduit means to interconnect the first heat exchanger and an indoor heat exchanger for transfer of heat energy by a fluid medium.

For selective changes of the mode of operation by the heat pump system of the present invention, selective switching of four three-way valves and three pumps for a fluid medium is carried out in an effective manner. Heat energy is carried to and from the heat exchangers by a fluid medium that is preferably an ethylene glycol solution or other heat transfer fluid which assures safe operation at sub-freezing temperatures and effective transfer of heat to and from the refrigeration cycle of the circuit.

A further aspect of the present invention provides a heat pump method including the steps of using a solar energy heat exchanger to heat a circulating fluid medium for maintaining the fluid medium at a storage temperature of at least $120°$ F., circulating the fluid medium from storage to an indoor heat exchanger to heat indoor air, using an outdoor air heat exchanger to heat circulating fluid medium for maintaining the fluid medium at a storage temperature of at least $60°$ F., using a refrigerant in a non-reversing refrigeration cycle to transfer heat from the fluid medium in storage when heated by the outdoor air heat exchanger, transferring heat from the refrigerant to an indoor heat exchanger to heat indoor air, using the refrigerant in the non-reversing refrigeration cycle to transfer heat from the indoor air to the fluid medium in storage, and transferring heat from the fluid medium in storage at a temperature of at least 40° F. to ambient air by an outdoor air heat exchanger.

These features and advantages of the present invention as well as others will be more fully understood when the following description of the preferred embodiment of the invention is read in light of the accompanying drawings which form a part of the specification, and in which.

Figure 1:
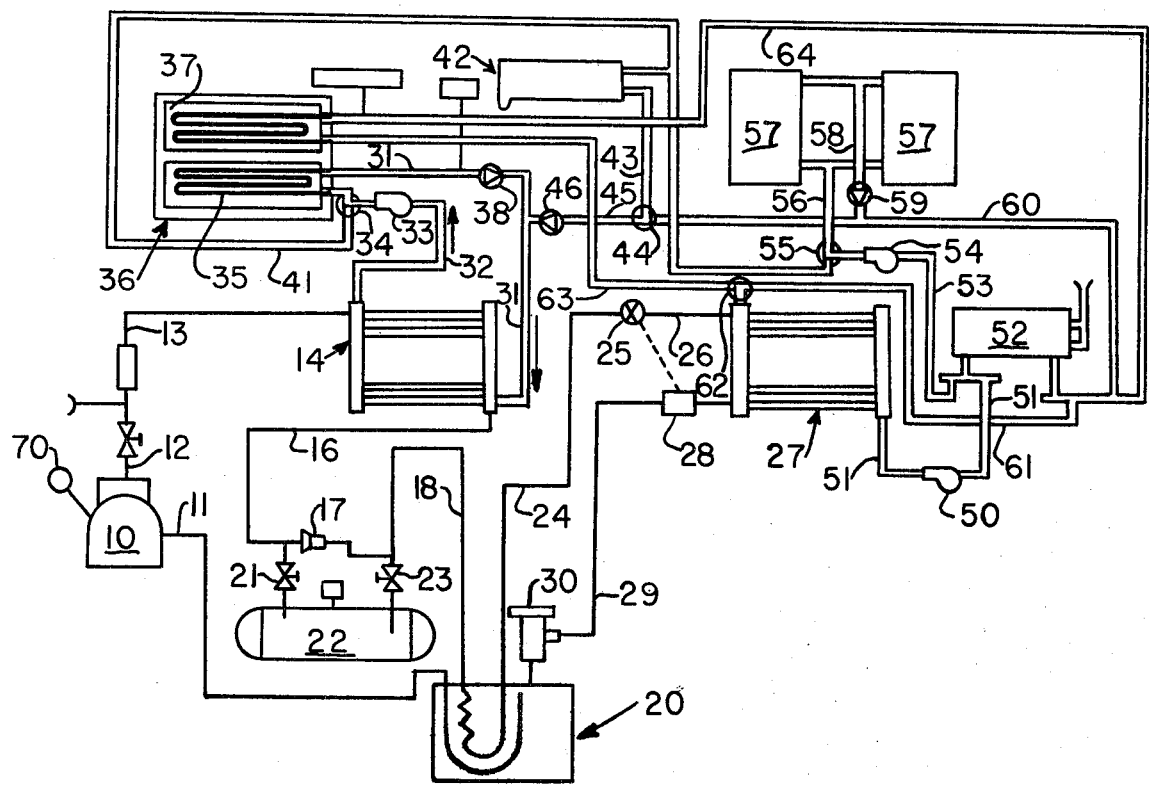
FIG. 1 is a schematic view of the entire heat pump system of the invention.

With reference now to the drawings and particularly to FIG. 1, the system shown includes a compressor 10 of conventional construction having an input or suction intake line 11 and an output or discharge line 12. The compressor discharge line 12 is connected through a conduit 13 to the inlet side of a first heat exchanger 14, preferably in the form of a water-cooled condenser with cooling tower circuiting which preferably embodies a construction to permit cleaning of the heat exchange tubes therein. The heat exchanger 14 functions only as a condenser during both the heating and cooling cycles. In the refrigeration circuit, the exit side of the heat exchanger 14 is connected by a conduit 16 and shut-off valve 21, to the inlet of receiver 21, and through check valve 17 and line 18, with the high pressure side of a combination suction-liquid heat exchanger-suction accumulator 20. The outlet of receiver 22 is connected through valve 23 to line 18 so that refrigerant can either flow directly from heat exchanger 14 by way of check valve 17, or from receiver 22 by way of shut-off valve 23. Liquid refrigerant medium is delivered through the high-side of the combination suction-liquid heat exchanger-suction accumulator by conduit 24 to an expansion device 25, preferably in the form of a thermostatically-operated expansion valve for delivery through a conduit 26 to a second heat exchanger 27. Preferably, heat exchanger 27 takes the form of a chiller which is capable of operating at close to zero degree superheat using, for example, an expansion valve sensor 28 which provides an electrical signal for the operation of an expansion valve 25. The expansion valve 25 is coupled in a conduit line 26 to deliver expanded refrigerant to the heat exchanger 27 where refrigerant is evaporated by heat energy delivered by the fluid medium pumped through it. Vaporized refrigerant flows through line 29 to hold-back valve 30 into the low-pressure side of the combination suction-liquid heat exchanger-suction accumulator 20. Refrigerant vapor from the heat exchanger-suction accumulator 20 is fed to the inlet line 11 of compressor 10. The hold-back valve 30 is set to maintain constant maximum compressor suction pressure regardless of evaporator pressure fluctuations caused by changing fluid medium temperatures in the heat exchanger 27.

Referring, again, to heat exchanger 14, a second fluid medium which can be any suitable heat transfer fluid, for instance an aqueous solution of ethylene glycol, is circulated through the heat exchanger by an inlet conduit line 31 and a delivery conduit line 32 having a pump 33 therein. At the discharge side of the pump in line 32, there is a three-way valve 34. In the following description and in the table of FIG. 1, "OFF" means that a valve, solenoid or pump is deenergized and "ON" means that a valve, solenoid or pump is energized. In the "OFF" position of valve 34, the fluid medium is passed through a first heat exchange coil 35 in an indoor air-handling unit 36 which has a second heat exchange coil 37. Air-handling unit 36 is provided with a motor-driven fan, not shown, in accordance with usual practice to direct a flow of air through the heat exchanger into a conditioned space. The fluid medium in coil 35 is delivered by conduit 31 through a check valve 38 for return to the inlet side of heat exchanger 14. Valve 34 can assume a second "ON" position in which the flow of a fluid medium from pump 33 passes in conduit line 41 to an outdoor air heat exchanger 42. When the fluid medium is fed to heat exchanger 42 by conduit 41, it is discharged therefrom by conduit 43 through a three-way valve 44 which is in its "OFF" position to direct the fluid medium to a conduit 45 for delivery through check valve 46 to conduit 31. Check valve 38 prevents a backflow of the fluid medium into heat exchange coil 35 so that the entire return flow is directed by conduit 31 to heat exchanger 14. Outdoor heat exchanger 42 is used, as will be described hereinafter, for extracting heat from outdoor air or as a heat sink for the heat pump during cooling operation.

Turning, now, to heat exchanger 27, a flow of the same fluid medium, for instance the same aqueous solution of ethylene glycol as in heat exchangers 36 and 42, is fed to the heat exchanger by a pump 50 in conduit line 51. Conduit line 51 is coupled to the outlet of a storage tank 52. The outlet of tank 52 is branched by a conduit 53 to feed a second flow of the fluid medium to pump 54 through a three-way valve 55 which is in its "OFF" position, in a water-source heat pump mode of operation, to direct the flow to a line 56 to the entry ports of each of a plurality of solar panels 57. Two solar panels are shown schematically in FIG. 1; however it is to be understood that a multitude, such as six or more such panels, will typically be coupled in this manner to heat the received fluid medium. A preferred form of solar panels is shown in U.S. Pat. No. 4,064,868 which issued to the Assignee of this invention. A return of heated fluid medium from the solar panels is conducted by a discharge conduit 58 through a check valve 59 to a discharge conduit 60 extending to the input side of storage tank 52. This input side is also connected by a line 61 having a three-way valve 62 therein which can, in its "OFF" position, direct the fluid medium from the heat exchanger 27 through a line 61 to the tank 52.

Figure 2:
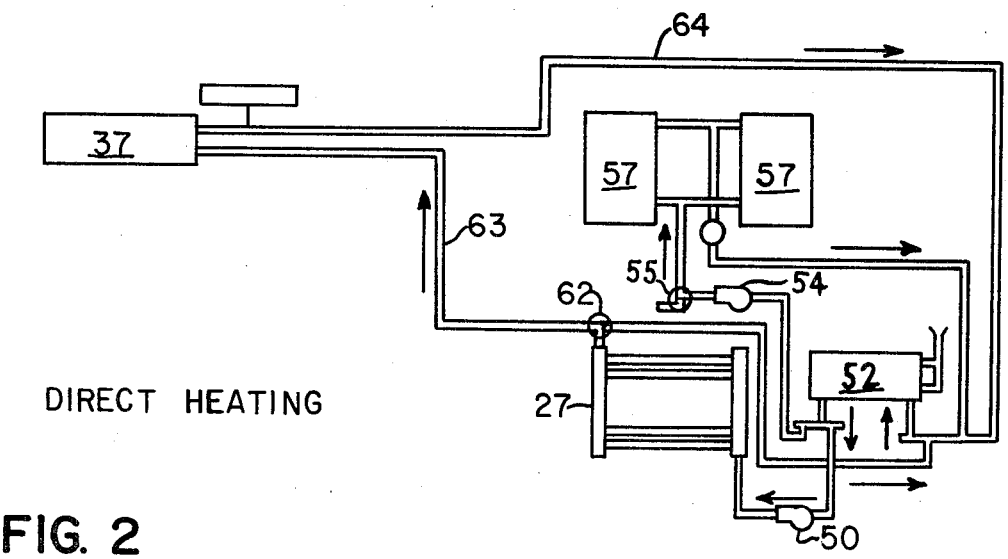
FIG. 2 is a partial schematic diagram of the system of the invention showing the direct heating cycle.

For direct heating mode of operation of the present invention using solar panels as a heat source shown in FIG. 2, the three-way valve 62 is in its "ON" position so that a discharge flow of fluid medium from heat exchanger 27 is directed to heat exchange coil 37 by conduit line 63. A return flow of fluid medium from heat exchange coil 37 is directed by line 64 for return to tank 52.

As described above, the heat pump system of the present invention operates in four distinct modes. The refrigeration cycle is not used during the direct heating mode as just described. In the remaining modes, the refrigeration cycle is controlled by an operating thermostat (not shown) which starts the compressor 10 when the temperature of the conditioned space deviates 2° F. from its design level. Switching of the refrigeration cycle to the heat pump mode from the cooling mode to heating mode or vice versa is carried out without the use of reversing controls. Such mode changes are accomplished by positioning the four three-way valves 34, 44, 55 and 62 and the three pumps 33, 50 and 54, as shown in the table in FIG. 1. The circuit for the aqueous solution of ethylene glycol includes the two separate coils in heat exchanger 36. Coil 37 is coupled to the solar panels 57 and may be used for either heating or cooling. Coil 35 is coupled to the condenser circuit including heat exchanger 14 for use during the heat pump cycle. Coil 37 will normally operate at a lower water-to-air temperature difference and, therefore, should have greater heat transfer surfaces than conventional hot-water heating coils. It is within the scope of the present invention to provide additional controls for operation of coil 35 as a reheat coil during the cooling cycle.

For the water source heat pump mode, pump 50 as shown in FIG. 1 delivers the heat transfer fluid from the storage tank 52 through heat exchanger 27, and back to tank 52. Pump 54 delivers the fluid from storage tank 52 to the solar panels 57 which will operate at fluid temperatures from +60° F. to +80° F. At +20° F. ambient, this corresponds to an efficiency of 50% to 55% and approximately 315 W/m² or 100 BTUh/sq. ft. of collector. For example, for a compressor capacity of 120,000 BTU/h, a collector surface of about 120 square feet is required. Conveniently, seven collector panels of the type shown in the aforesaid U.S. Pat. No. 4,064,868 are required. Under these conditions, the coefficient of performance is approximately 3.3, thus providing a gross heating capacity of 3.3KW or 11,300 BTU/h per compressor kilowatt at +35° F. evaporating temperature and +130° F. condenser temperature. For R-12 refrigerant, the evaporator pressure would be approximately 32.6 psig. The condenser pressure is 181 psig. For example, tank pump 50 may deliver fuid medium at +77° F. to the heat exchanger 27 through valve 62 back to the storage tank. In the heat exchanger 27, the fluid is cooled from +77° F. to +68° F. by +35° F. evaporating refrigerant. The refrigerant evaporated in the heat exchanger 27 is compressed and delivered to heat exchanger 14 in which refrigerant condenses at approximately +122° F. to +131° F. Pump 33 delivers 104° F. fluid medium through check valve 38 to heat exchanger 14 where it is heated to 113° F. From the heat exchanger 14, the fluid flows back to the heat exchanger 35 where it is cooled to 104° F. During this mode, valve 34 is "OFF" and open to coil 35. Collector check valve 46 is closed by the pump pressure to prevent loss of the fluid medium to heat exchanger 42 which is not used in this mode. In this example, the flow rate of fluid medium through the circuit having heat exchanger 27 therein and the circuit having heat exchanger 14 therein will be approximately 7 gallons per minute. These flow rates remain unchanged during all parts of the cycle.

For direct heating mode of operation and with reference to FIG. 2, when rising outdoor temperatures occur, the storage tank temperature increases and at +122° F., the refrigeration cycle is stopped and the cycle is switched to the direct heating mode. With valve 62 in its "ON" position which is closed to the storage tank 52, the tank pump 50 delivers the fluid medium at +122° F. through heat exchanger 27 which is inoperative in this mode of operation, to heat exchange coil 37 by way of conduit 63 and back to the storage tank by way of conduit 64. As during the heat pump cycle, the water is cooled in coil 37 to approximately +113° F. with the airflow therethrough being heated from +64° F. to +95° F. In this example, airflow through heat exchange coil 37 is approximately 850 CMF.

Figure 3:
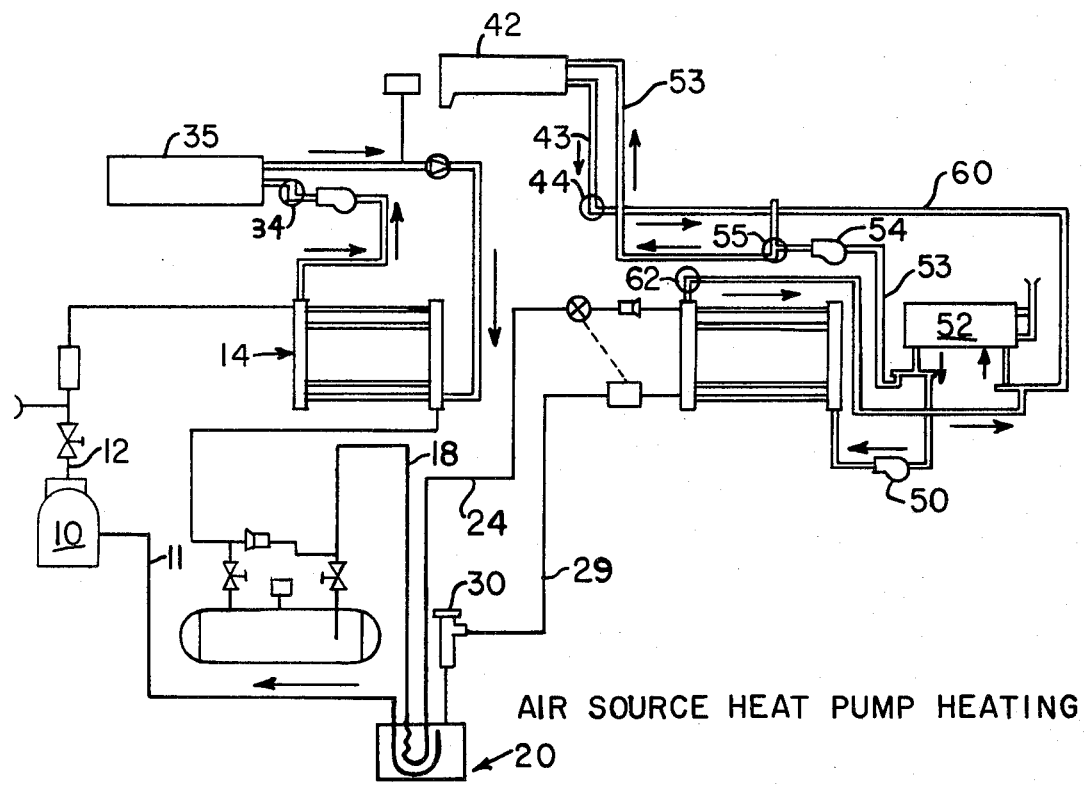
FIG. 3 is a partial schematic diagram of the system of the invention showing air source heat pump heating by the system.

The air source heat pump mode of operation is shown schematically in FIG. 3. For this mode of operation, the heat source is switched from the solar collectors to the heat exchanger 42. The heat of ambient air in the fall and spring is used when the outdoor temperature is 40° F. to 65° F. Heating is, therefore, possible during either the night or during cloudy days. The circulation of heat transfer fluid on the condenser side, i.e., through heat exchanger 14 is the same as described above for the water source heat pump mode of operation. Valve 55 is closed to collectors and pump 54 delivers heat transfer fluid from storage tank 52 to heat exchanger 42 by way of line 53 and from the heat exchanger 42 through valve 44 which is in "ON" position, line 43 and line 60 back to the tank 52. The circulation of the aqueous fluid through heat exchanger 14 and heat exchange coil 35 is the same as described above during the water source heat pump mode of operation. A motor-driven fan, not specifically shown but well known in the art, is used in heat exchanger 42 for the transfer of heat from ambient air to the heat transfer fluid.

Figure 4:
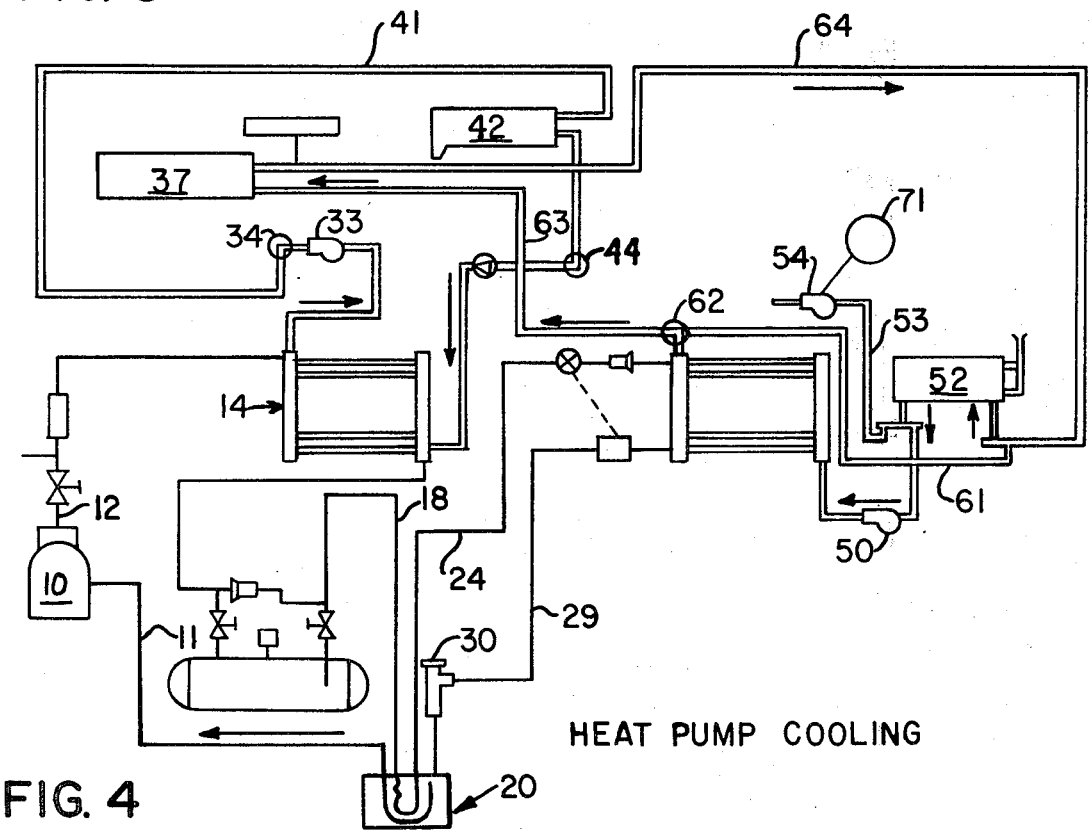
FIG. 4 is a partial schematic diagram of the system of the invention showing heat pump cooling.

In the heat pump cooling mode of operation, as shown in FIG. 4, a space thermostat, not shown, operates through a relay to stop pump 54 and energize the motor-driven fan in heat exchanger 42. Valve 62 is moved to its "ON" position where it is open to line 63 and heat exchange coil 37 and closed to line 61 and tank 52. Valve 34 is moved to its "ON" position where it is closed to heat exchange coil 35 and open to interconnect pump 33 with heat exchanger 42. The temperature of the heat transfer fluid in the storage tank 52 is permitted to drop to +45° F. before pump 50 is energized. When pump 33 is energized, chilled heat transfer fluid is pumped to heat exchange coil 37 through line 63 by pump 50 and back to the storage tank 52 through line 64. The suction pressure in the refrigeration circuit is approximately the same as during the heat pump cycle while the R-12 discharge pressure at +95° F. ambient will be approximately 162 psig, corresponding to 122° F. condensing temperatures.

Thus, it can be seen that the heat pump system of the present invention provides relative simplicity, both in the refrigeration circuit and in the heat transfer fluid circuit. The problems encountered with reversing heat pumps are eliminated since the need to reverse the refrigerant cycle does not exist in this system. The heat transfer fluid circuit requires four three-way valves plus ordinary water and air temperature controls as used in conventional air-conditioning systems. A single storage tank at atmospheric pressure may be used for all three modes of operation. The heat pump system of the present invention can be readily combined with a domestic hot-water system by the use of a heat exchanger in a solar panel circuit.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A heat pump including the combination of:
   an outdoor air heat exchanger for supplying heat to a fluid medium only at a high coefficient of performance, a solar energy heat exchanger for supplying heat to a fluid medium at times other than the operation of said outdoor air heat exchanger, means including a storage container for selectively circulating fluid medium to either of said outdoor air heat exchanger or said solar energy heat exchanger, first and second indoor heat exchangers, means forming a non-reversing refrigeration cycle for transferring the heated fluid medium between said storage container and either said first indoor heat exchanger or said outdoor air heat exchanger, and conduit means including valves for selectively circulating fluid medium between said second indoor heat exchanger and said storage container.

2. A heat pump system including the combination of a solar radiation heat exchanger, an outdoor air heat exchanger, a pump, a storage tank, first conduit means for interconnecting said outdoor air heat exchanger and said solar radiation heat exchanger with said pump and said storage tank, means for interrupting communication between said storage tank and either of said solar radiation heat exchanger and said outdoor air heat exchanger, first and second heat exchangers, a compressor, second conduit means interconnecting said compressor and said first and second heat exchangers for operation in a non-reversing refrigeration cycle, expansion valve means in said second conduit means for said first heat exchanger, third conduit means for interconnecting said storage tank and said first heat exchanger, first and second indoor heat exchangers, fourth conduit means interconnecting said second heat exchanger and said first indoor heat exchanger, fifth conduit means for interconnecting said second indoor heat exchanger with said storage tank, and pump means in said third conduit means for feeding a fluid medium from said storage tank to said first heat exchanger, said means for interrupting communication including a valve to direct the output of a fluid medium from said storage tank through said first heat exchanger and through said second indoor heat exchanger for return to said storage tank.

3. The heat pump system according to claim 2 further including sensor means in said second conduit means to respond to the temperature of the refrigerant after discharge from said first heat exchanger for controlling said expansion valve means.

4. The heat pump system according to claim 2 or 3 further including means for defining a combined suction-liquid heat exchanger and suction accumulator to supply fully vaporized refrigerant in said second conduit means to said compressor.

5. The heat pump system according to claim 2 or 3 further including hold-back valve means for maintaining a constant suction pressure for vaporized refrigerant delivered by said second conduit means to said compressor.

6. The heat pump system according to claim 2 wherein said means for interrupting communication includes first and second valves having a first condition in which a fluid medium is circulated between said solar radiation heat exchanger and said storage tank, and a second condition in which a fluid medium is circulated between said outdoor air heat exchanger and said storage tank.

7. The heat pump system according to claim 6 further including a second pump to circulate a fluid medium between said storage tank and said first heat exchanger.

8. The heat pump system according to claim 2 wherein said first heat exchanger includes a counterflow liquid chiller, and wherein said second heat exchanger includes a counterflow liquid-cooled condenser.

9. A heat pump method including the steps of:

using a solar energy heat exchanger to heat a circulating fluid medium for maintaining the fluid medium at a storage temperature of at least 120° F., circulating the fluid medium from storage to a second of two indoor heat exchangers to heat indoor air, using an outdoor air heat exchanger to heat circulating fluid medium for maintaining the fluid medium at a storage temperature of at least 60° F., using a refrigerant medium in a non-reversing refrigeration cycle to transfer heat from the fluid medium in storage when heated by said outdoor air heat exchanger, transferring heat from the refrigerant medium to a first of the two indoor heat exchangers to heat indoor air, using the refrigerant medium in said non-reversing refrigeration cycle to transfer heat from the indoor air to the fluid medium in storage, and using said outdoor air heat exchanger to cool the medium by transferring heat from the fluid medium to the ambient air.

10. A heat pump system including the combination of a solar radiation heat exchanger, an outdoor air heat exchanger, a pump, a storage tank, first conduit means for interconnecting said outdoor air heat exchanger and said solar radiation heat exchanger with said pump and said storage tank, means for interrupting communication between said storage tank and either of said solar radiation heat exchanger and said outdoor air heat exchanger, first and second heat exchangers, a compressor, second conduit means interconnecting said compressor and said first and second heat exchangers for operation in a non-reversing refrigeration cycle, expansion valve means in said second conduit means for said first heat exchanger, third conduit means for interconnecting said storage tank and said first heat exchanger, first and second indoor heat exchangers, fourth conduit means interconnecting said second heat exchanger and said indoor heat exchanger, said means for interrupting communication including first and second valves having a condition in which a fluid medium is circulated from said storage tank through said first heat exchanger and said second indoor heat exchanger, and second valve means in said fourth conduit means for interconnecting said second heat exchanger with said outdoor air heat exchanger while interrupting communication with said indoor heat exchanger.

* * * * *